MEMORY SYSTEM

Filed Dec. 28, 1961

4 Sheets-Sheet 1

INVENTORS
HAROLD E. PETERSEN
MICHAEL TEIG
BY Robert E. Sandt
AGENT

March 8, 1966 H. E. PETERSEN ETAL 3,239,818

MEMORY SYSTEM

Filed Dec. 28, 1961 4 Sheets-Sheet 2

MEMORY SYSTEM

March 8, 1966 H. E. PETERSEN ETAL 3,239,818

MEMORY SYSTEM

Filed Dec. 28, 1961 4 Sheets-Sheet 4

United States Patent Office 3,239,818

Patented Mar. 8, 1966

3,239,818

MEMORY SYSTEM

Harold E. Petersen, Chappaqua, and Michael Teig, Yonkers, N.Y., assignors to International Business Machines Corporation, New York, N.Y., a corporation of New York

Filed Dec. 28, 1961, Ser. No. 165,268

9 Claims. (Cl. 340—172.5)

This invention relates to digital memory systems, and more particularly to a system for combinatorially comparing the data content of chosen portions of one or more selected memory words with the corresponding portions of the remaining memory words, and registering which memory words match the data content of the chosen portions of the selected words, so as to control the readout from memory of the total data content of those words whose compared portions match the sought data content of the chosen portions of the selected words.

In prior art searching systems, including punched cards, magnetic spots on tapes, drums, etc., photographic storage, and conventional magnetic core storage, it has been possible to extract data having desired characteristics by sequentially comparing each record against the sought characteristics stored in an interrogation register. Necessarily, such systems, by their sequential interrogation, require a search time which is a direct function of the number of records to be searched. A newer concept, termed "fully associative memory," permits of the parallel-by-record interrogation of the total memory content for the presence of any record having a predetermined sought data content in selected portions of the record, and the extraction of the total data content of those records having the sought characteristics. In this last-named art, it has hitherto been necessary to store in some form of an interrogation register, external to the memory itself, the respective bit statuses defining the data content which is sought to be found among the stored memory words. Necessarily, if the interrogation register is to manifest the search question, then, the respective bit statuses which define the sought data content must be known in advance.

The instant invention advances the fully associative memory art by enabling any one or more chosen portions of any one or more selected memory words to serve, either singly or in combination, as the search criteria, against which the data content of corresponding portions of the other memory words are compared, so as to registre those words matching the sought criteria, and permit the readout from memory of the total data content of the thus-found matching words. Not only does this system of interrogation make it possible to construct a search question among overlapping fields in different words, but also it allows a search for records having a data content, the specific composition of which may actually be unknown. For example, in the field of information retrieval, or mechanized literature searching (including patents), it frequently occurs that the searcher knows the identity of one or more documents that are pertinent to his search. He, therefore, wants all other documents having similar characteristics, even though he may not know how the classifier may have characterized the known documents. Naturally, he can look up the characteristics of the known document, frame his question accordingly, and load it into an interrogation register. This invention obviates such a lookup step. The searcher now needs only to know that the characteristics (whatever they may be) which define his known documents, are stored in specified bit positions of given word positions in memory. The searcher is in effect, defining his search by requiring memory to identify all documents having the same characteristics as those which are stored in specified memory positions for each of the selected documents, it being known which memory word positions store the characteristics which define each of the documents known to be pertinent to the search. Additionally, the interrogation system, constituting the subject matter of this invention, permits the characteristics of several documents to be combined. For example, in patent searching it may be desirable to search for a so-called "teaching reference," which shows the combination of certain functional units. If one has knowledge of several patents, each of which discloses one of the component functions which he desires to be combined in the teaching reference, he can through use of this invention, find the identity of all patents combining the individual functions of the known patents. Not only may functions, or other characteristics, be additively combined, so too, may they be alternatively combined. In this instance, the search defines his question in the alternative, as, for example, identify all patents having the characteristics stored in field A of word position 1 (storing the characteristics of the first known patent) and the characteristics of field B of word position 2 (storing the characteristics of the second known patent), or identify all patents having the characteristics stored in field $\alpha$ of word 1 and the characteristics of field $\beta$ of word 2. The fields A, B, $\alpha$ and $\beta$ may be composed of any combination of bit positions within the chosen words, and may overlap within any one word, or may overlap in corresponding bit positions of several words. Other searches, as will be explained, may be constructed by logical "and" and logical "or" functional combinations of fields.

It is, therefore, a first object of this invention to provide a memory interrogation system wherein the data content from a plurality of different fields of a plurality of different words stored in memory by the respective states of stability of bi-stable storage elements are combinatorially selected as a search criterion against which the remaining non-selected words are compared in parallel to register a match.

A second object of this invention is to compare the data content of any selected portion of any given memory word with the data content of a corresponding portion of all the remaining words in memory to register which of those remaining words have the same characteristics.

Another object is to compare the data content of the same selected corresponding portion of a plurality of data words with the corresponding portion of the remaining data words, and registering which of those remaining words matches the data contained in the selected portion of any one or more of the given plurality of words.

Yet another object of this invention is to provide a memory system wherein the data content of different selected portions of a given plurality of words is compared with corresponding portions of the remaining words, and those of the remaining words registered which manifest a matched data content with all of the selected portions of all the given plurality of words.

A further object is to provide a memory wherein the data content of different selected portions of a given plurality of words is compared with the corresponding portions of the remaining words, and those of the remaining words reigstered which manifest a matched data content with any one or more of the selected portions of the given plurality of words.

An even further object is to provide a memory wherein the data content of a selected portion of a first word and the data content of a selected different portion of a plurality of further given words are compared with the data content of corresponding portions of the remaining memory words, and those of the remaining words registered which manifest a data content matching the selected portion of said first given word and the selected portion of any one or more of said plurality of further given words.

An additional object is to provide a memory wherein the data content of a selected portion of a first word and the data content of a selected different portion of a plurality of further given words are compared with the data content of corresponding portions of the remaining memory words, and those of the remaining words registered which manifest a data content matching the selected portion of said first given word, or the selected portion of any one or more of said plurality of further given words.

A final and specific object of the invention is to provide a memory system having a plurality of bi-stable elements selectively pre-established in one of their stable states to manifest the respective bit statuses of a plurality of stored data words together with means for comparing the stability states of any selected ones of the bi-stable elements with the stability states of corresponding ones of the remaining elements to achieve the matching functions in accordance with the foregoing objects.

The foregoing and other objects, features and advantages of the invention will be apparent from the following more particular description of a preferred embodiment of the invention, as illustrated in the accompanying drawings.

Figures 2, 3C, 4:
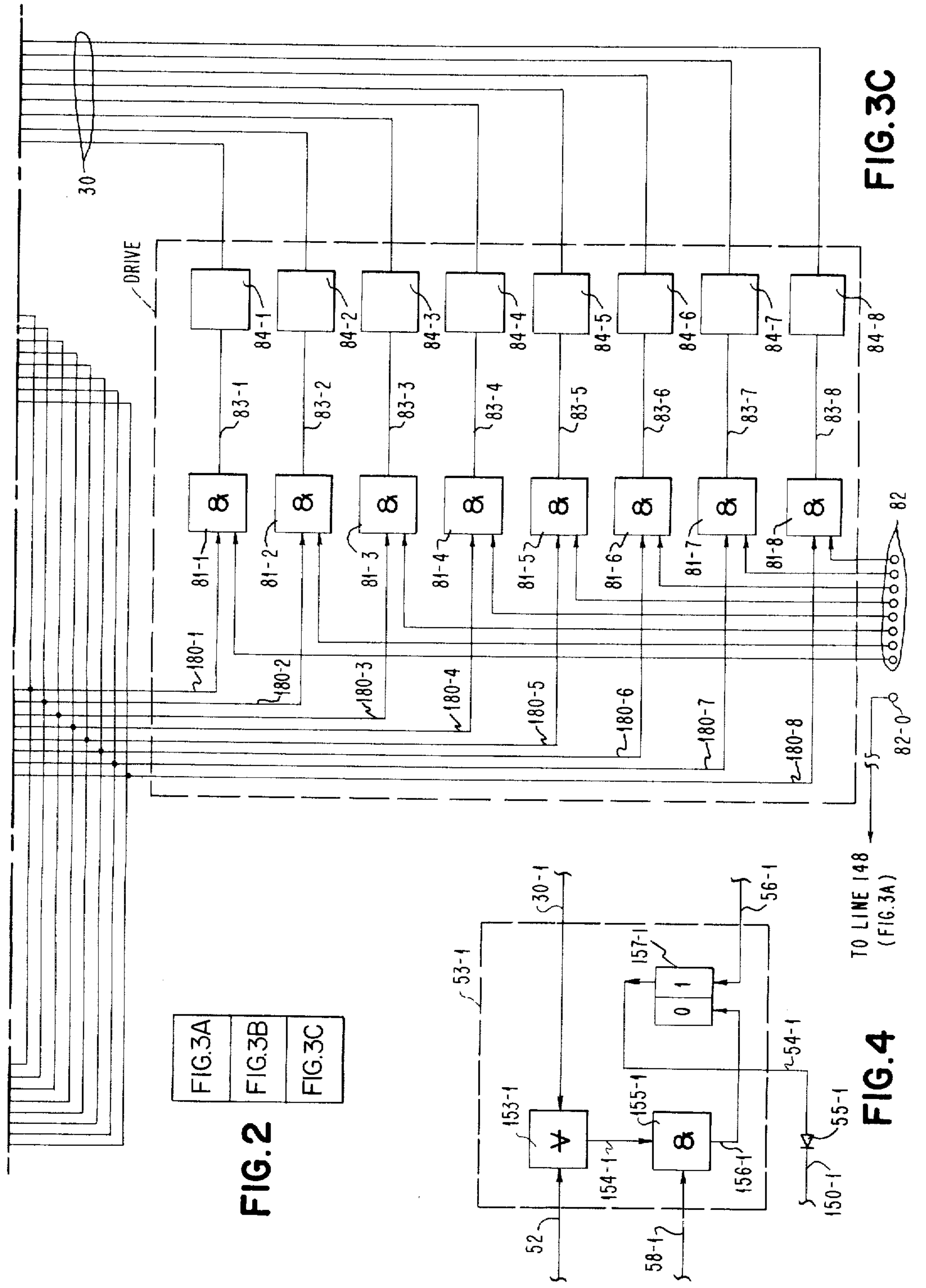
FIG. 2 shows the organization of the detailed drawings and their assembly into a composite wiring diagram.
Figure 3B:
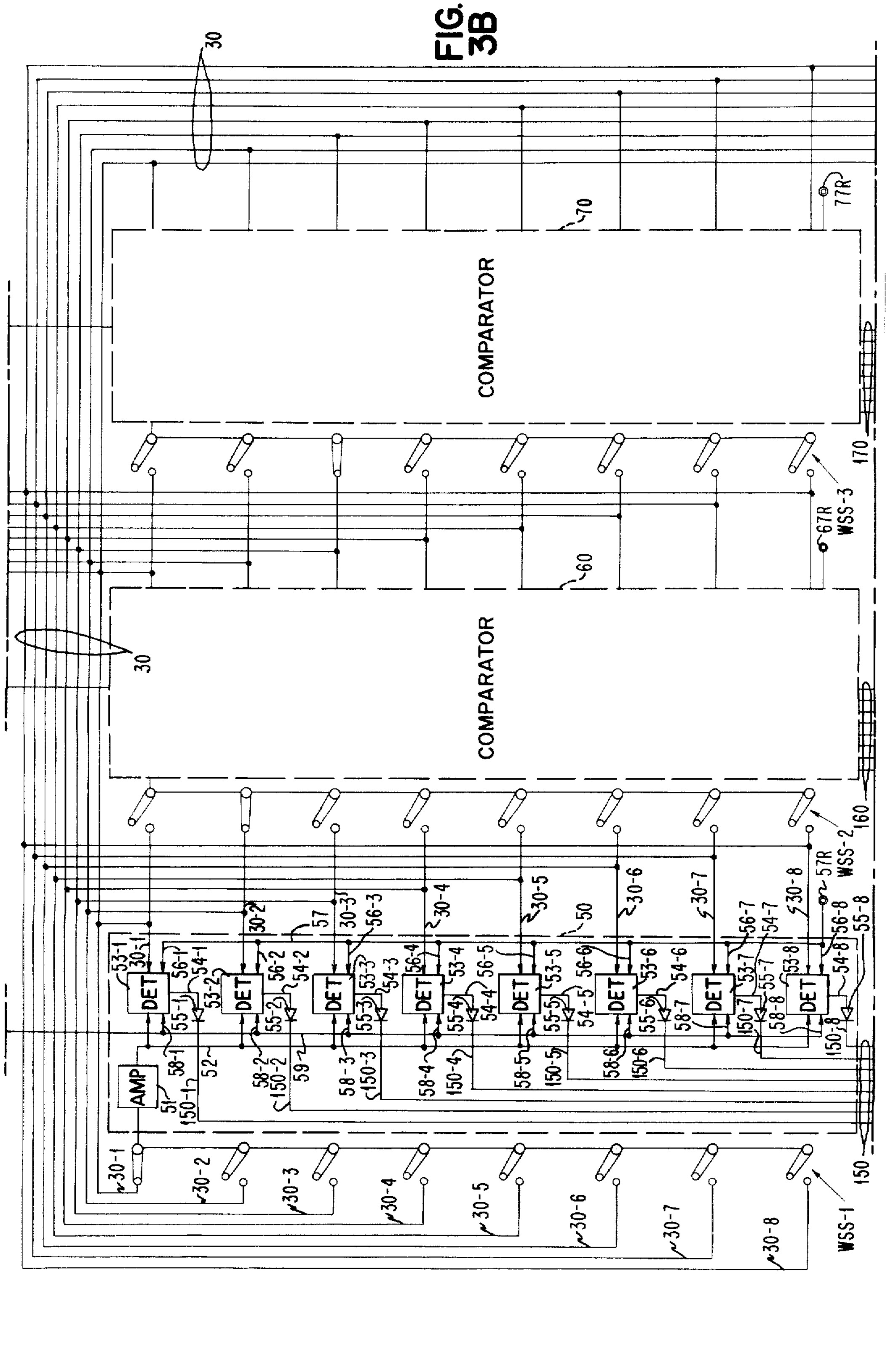
Figure 3A:
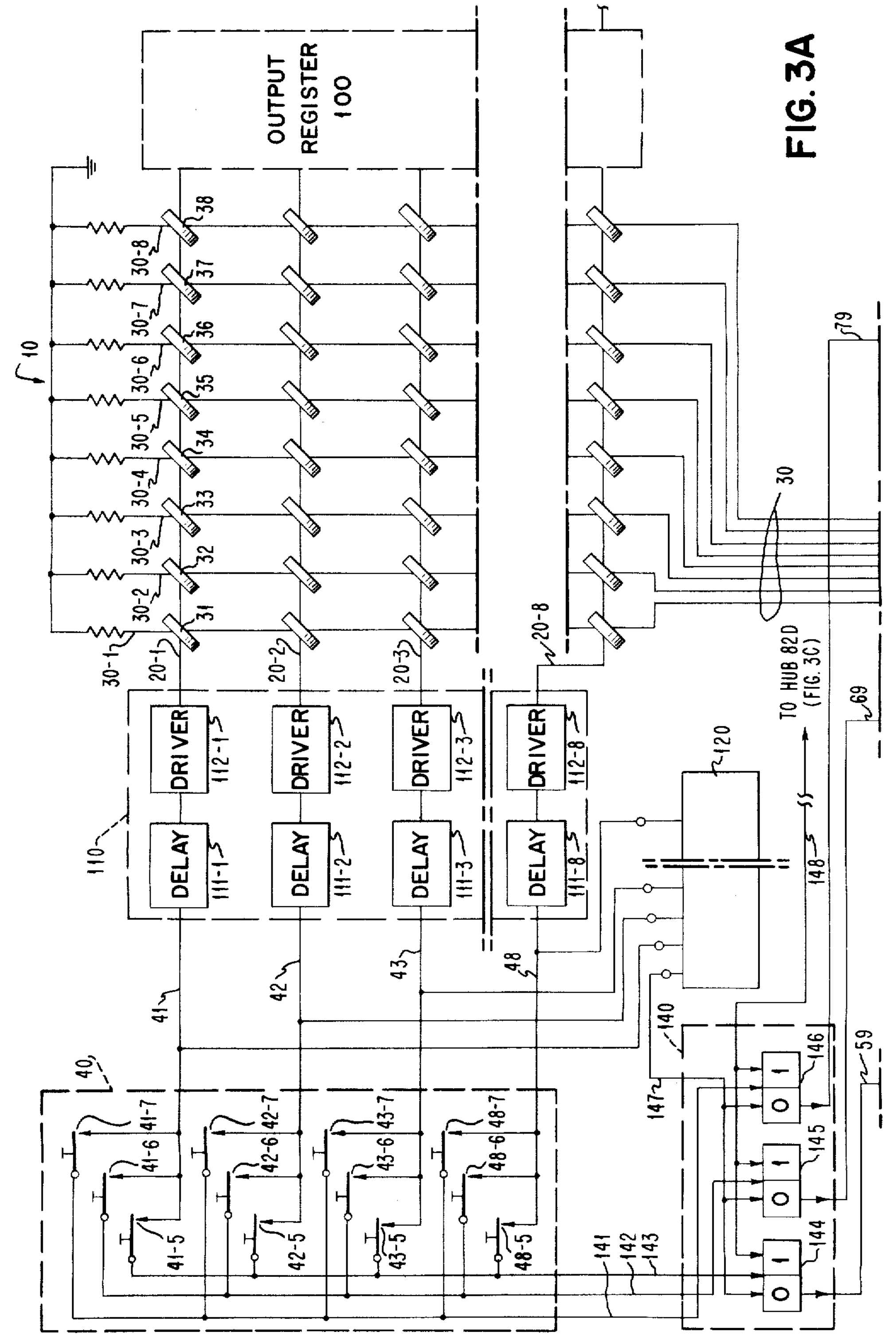

FIGS. 3A, 3B, and 3C constitute the wiring diagram of the invention arranged as shown in FIG. 2.

FIG. 4 is a detailed drawing of the detector shown in FIG. 3B.

Before proceeding with either a broad functional description of the invention or a detailed structural description thereof, it is well to digress and set forth a few definitions to assist in the understanding of the exposition to follow. A *fully associative memory* is one in which a data record can be retrieved, not only by its location or address, but most particularly by specifying the information content of any arbitrary portion of this sought word, the memory words being interrogated in parallel for their data content. A *bit* is employed in this specification in accordance with conventional terminology, namely, a binary digit, or the smallest unit of information; a yes or no as manifested by the state of an element, or the presence or absence of a pulse at a given significant time. A *field* is a set of one or more bits in their specified relation to the word, which are treated as a whole and would, in corresponding records, be logically expected to contain allied information. A *word* is defined as a predetermined set of bits or a set of fields, for the purposes of this specification. Thus, when a predetermined portion of a given word is to be compared with a corresponding portion of the remaining memory words, it is to be construed that certain bit positions of any given word are selected and these same bit positions of the remaining words are compared therewith to effect the interrogation.

Figure 1:
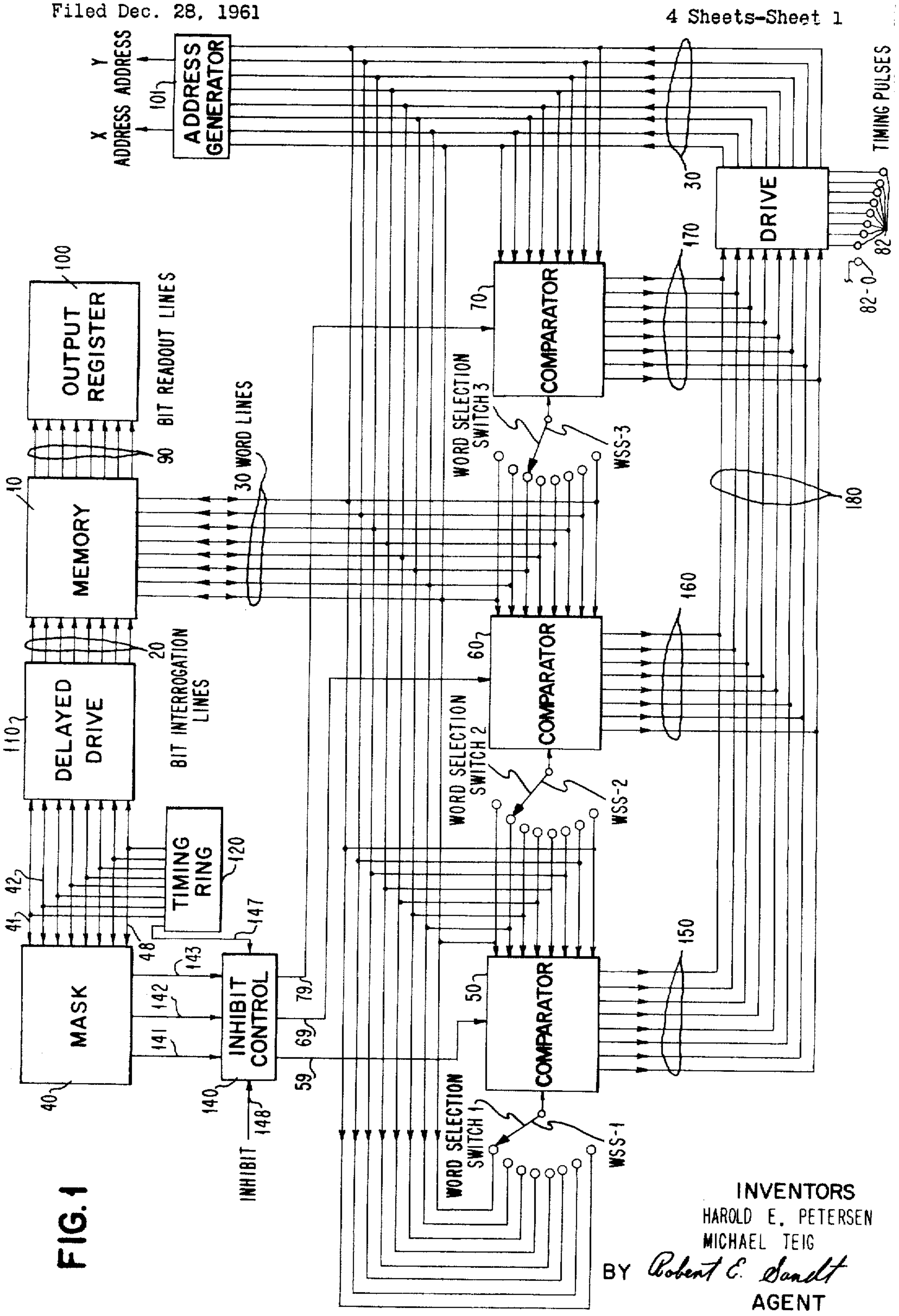
FIG. 1 is a schematic showing of the functional blocks constituting the memory system.

Referring now to the schematic showing of the invention shown in FIG. 1, the memory 10 contains ordered bi-stable bit storage elements which are selectively pre-established in one of their stable states to manifest the respective bit statuses of the bits constituting the individual words. The memory is so constituted that the stability states of the storage elements may be interrogated nondestructively. The memory is provided with bit interrogation lines 20, there being at least one line for each bit position, each line coacting with a corresponding bit storage element of each of the data words. A plurality of word lines 30, there being at least one for each word stored in memory, coact with the bit storage elements such that each word line is operatively coupled to all the elements storing the bits of that word. Because of the coaction of the bit lines 20 and the word lines 30 with the bi-stable storage elements in the memory, an interrogation signal applied to any one bit line will produce a signal in all of the word lines manifestive of the stability states of the thus interrogated bit storage elements relative to the character of the interrogation. In former fully associative memories, the character of the interrogation signals applied to the respective bit lines was so chosen as to manifest the bit characteristics of the data content sought among the stored data words, and the response of the storage elements thereto analyzed to register those words having a data content matching that which is sought. In the present invention, since the respective bit configurations of the sought data may or may not be fully known, a standard interrogation signal is sequentially applied to each of bit lines 20. These sequentially applied signals produce on each of the word lines 30 a sequence of response signals, the characteristics of which are a function of the stability states of the bi-stable elements storing the respective bits of each word. Since binary or bi-stable elements are employed as bit storage elements, the word lines 30 will yield one signal characteristic of a binary "0" and a different signal characteristic of a binary "1." If any one memory word is chosen as the one whose data content is to be matched in selected portions thereof by the remaining memory words, then the response signals appearing on that word line coupled to the bit storage elements storing the bits of the chosen word are to be compared with the response signals yielded by all of the other word lines 30. Wherein, less than a complete word is selected for comparison, then, to prevent unwanted mis-matches on non-selected bit positions, means must be provided for inhibiting comparison when the non-selected bit positions receive the interrogation signals.

The comparison of the bit responses on the word line corresponding to the chosen word with the bit responses on the remaining word lines is achieved in a comparator, of which three (50, 60, and 70) are shown. Each comparator has a word selection switch (WSS–1, WSS–2, or WSS–3), which switch can selectively connect each of the comparators with any one of the word lines 30. By this selective connection, the comparator 50 may be connected to one word line, the comparator 60 to a second word line, and the comparator 70 to a still third word line to permit three different words to be matched during a common interrogation cycle. Each comparator also has a permanently connected input from each of the word lines 30. The comparators 50, 60, and 70 have matching word output lines 150, 160, and 170, respectively. These matching word output lines signal the lack of a mis-match (match) of each respective word to the data content of the words selected for interrogation in each of the comparators 50, 60, and 70. The word match lines 150, 160, and 170 are commoned by lines 180 so that a match signal on any one word line yields a logical "or" function with respect to the other lines commoned therewith.

The comparators 50, 60, and 70 are further provided with the respective inhibit control lines 59, 69, and 79. These inhibit control lines are individually controlled for each comparator as to each separate bit position in memory. A control potential on any one of the inhibit control lines 59, 69, or 79 will render the associated comparator active to compare the bit responses appearing on the word lines connected thereto by the respective word selection switch and the permanent connections from the word lines 30. Thus, the respective inhibit control lines will be depotentialized to inhibit comparison during those times in the cycle when the interrogation signals, which are sequenttially applied to the bit interrogation lines 20, appear on the bit lines corresponding to the bit positions which are not significant for search purposes, as to each of the selected words.

The control of the comparator inhibit functions is vested in the mask 40 and in the comparator inhibitor 140. The mask 40 receives pulses from a timing ring delivered sequentially to the lines 41 through 48, there being one line for each bit position in memory 10. Switches, the connections of which will be subsequently described in detail, within the mask 40 selectively connect each line 41 through 48 to one or more of the three inhibit lines 141, 142, or 143, which change the status of the inhibit control 140 to provide the necessary inhibit control on the inhibit control lines 59, 69, and 79 at the appropriate bit times.

Not only does the timing ring 120 apply a sequence of pulses to the lines entering the mask 40 to condition the comparators 50, 60, and 70, but also the ring applies these same pulses to the delayed circuits 110, having outputs to the bit interrogation lines 20. The delayed drive circuits accept the sequence of pulses and apply them to the respective bit interrogation lines 20 with a delay sufficient to permit the inhibit control 140 to apply or to remove its inhibit control over the comparators 50, 60, and 70 in readiness for the interrogation of each successive bit.

Once an interrogation, as defined by the position of the word selection switches WSS–1, WSS–2, and WSS–3 and the mask 40 is complete, the comparators 50, 60, and 70 will manifest the match of any word to the interrogation by an appropriate signal on the respective word match signal lines 150, 160, and 170. Any match signal on any word signal line will, through the common lines 180, cause the drive circuits 80 to produce sequential drive pulses on those of the word lines 30 corresponding to the word positions in memory registering a match. Again, a standard character of drive pulse is employed. Each word line, when so driven, will produce in all of the bit readout lines a response which is a function of the storage state of the bit storage elements coupled by the driven line. These individual bit responses on the lines 90 will have one characteristic for a binary "0," and a second characteristic for a binary "1." The output register 100 will accept and store these binary manifestations, which now represent the total data content of the matching word or words, even though only a portion of the matching words was interrogated to achieve the match. The output register is obviously provided with controls to enter data parallel-by-bit, serially-by-word, and would in all probability be the buffer storage unit of an electronic data processing system.

Alternatively, and particularly useful for document extraction purposes, an address generator 101 is also provided. This address generator has an input from each of the word lines 30, so that when selected ones of these (corresponding to matching words) are driven by driver 80, the address generator will produce a codal output, or an X and Y addresses output, which will give access to other storage media, as for example, photographic storage, which would then display a micro-image of the sought document to the searcher's view. The X and Y address could for example, be a reel and frame number, or a bin and film strip number. So too, the X and Y address could be utilized to address a conventional core matrix memory to make available more detailed information with respect to the "found" record.

*Principle of operation*

The interrogation of the data content of memory 10 proceeds on the basis of detecting mis-matches rather than matches. The total lack of mis-matches as to any compared portion of any one word indicates a match of that word on the data content in the selected bit positions of the word or words selected as the basis for the interrogation. Each of the comparators 50, 60, or 70 compares the respective bit responses of every word with the bit responses of the selected word, and is capable of storing a mis-match if it occurs during a bit interrogation time when the comparator is operative to compare. Since any one mis-matched significant bit will destroy a match, the comparators store the first-occurring mis-match and cannot thereafter be changed by any number of subsequent occurring matches. Therefore, if, at the end of the interrogation, a comparator has registered no mis-matches between the compared bits of a word and the bits of the word chosen as the search criteria, the comparator signals that the found word has matched all bits compared with it. If these bits have been chosen from several fields of several different words then effectively the comparator has "anded" these fields. Since the individual word match signal lines 150, 160, and 170 are "ored" together, then it is possible to yield alternative match conditions. By virtue of the "and" function performed within the comparators, the "or" function performed by connecting their respective outputs in the "or" relationship, and by use of the selective inhibit control, it is possible to perform combinational word and field searches now to be described.

*Word and field combinations of search criteria*

For the purpose of describing the various combinations of interrogations that can be performed by the apparatus schematically shown in FIG. 1, it is well to examine some typical combinations in detail, and set forth the others by mathematical relationships. The nomenclature adapted for constructing these combinations of words and fields thereof is that W1, W2, and W3 denote any three memory words chosen to provide the search criteria in selected fields thereof. These words can be any words in memory and merely denote the first one of the three selected words, the second one of the three selected words, and the third one of the three selected words. Their order has no relationship to the order of the actual word positions selected. It is a mere nomenclature for constructing mathematical combinations. The Arabic alphabetic characters, A, B, C, etc., define fields, which, although arbitrarily chosen, do have the constraint that they may not overlap either within a word or across the words. For example, if field A defines the first three bit positions, then field A defines the first three bit positions in all memory words. Field B, therefore, may define any number of bit positions so long as it does not in this instance, include bit positions one, two, or three. The Greek alphabetic characters $\alpha$, $\beta$, $\gamma$, etc., also define non-overlapping fields within any one word, or across the words. An Arabic alphabetic field may, however, overlap a Greek alphabetic field. For example, field A may encompass the first three bit positions, and field B the fourth through seventh bit positions, while field $\alpha$ may encompass the second through the fifth bit positions and encompasses the sixth through ninth bit positions. Whenever Arabic and Greek alphabet characters are employed in the same logic expression, it is to be assumed that there is some overlap between the Arabic and Greek alphabetic fields; otherwise, without overlap, only one alphabet would have been employed.

Thus, when the shorthand W1–A is employed, it shall be understood that the data contained within field A of word 1 forms at least a part of the search question. Thus if the combination $$(W1\text{–}A \text{ AND } W2\text{–}A) \text{ OR } (W1\text{–}\alpha \text{ AND } W2\text{–}\alpha) \text{ OR } (W1\text{–}A \text{ AND } W2\text{–}B \text{ AND } W3\text{–}C)$$

is written, it is to be construed that any word (or words) may match any one or more of three search requirements, as follows:

(a) If field A of word 1 contains the same data as does field A of word 2, and if the sought word contains the same data in field A, then the match requirement will be satisfied, or (b) If field $\alpha$ of word 1 contains the same data as does field $\alpha$ of word 2, and if the sought word contains the same data in field $\alpha$, then the match requirements will be satisfied, or (c) If the sought word contains the same data in field A, as word 1 contains in field A, and contains the same data in field B as word 2 contains in field B, and contains the same data in field C as word 3 contains in field C, then the match requirement is met.

With the foregoing notations, a great variety of search combinations can be created. The following are representative samples:

(1) W1–A
(2) (W1–A AND W3–A) OR (W2–A AND W3–A)
(3) W1–A AND W2–A AND W3–A
(4) (W1–A AND W2–A) OR (W1–α AND W2–α)
(5) (W1–A AND W3–B) OR (W2–B AND W3–B)
(6) (W1–A AND W3–α) OR (W2–β AND W3–β)
(7) (W1–A AND W2–A AND W2–B) OR (W1–α AND W2–α AND W2–β) OR (W1–A AND W2–β AND W3–C)
(8) W1–A AND W2–α AND W1–B AND W2–β AND W3–C

The rules for operation of the apparatus of this invention are as follows:

(a) All bit positions of memory are serially interrogated.

(b) The number of comparators (50, 60, or 70) required for any search operation is equal to the number of alternative matches possible, up to the maximum of three for the embodiment illustrated.

(c) Even if less than the three comparators are required for any one search, all comparators must be connected to compare on some one of the required alternative match requirements, lest a false match condition be produced. Generally excess comparators will be connected to operate in parallel with one of the other comparators required to be used in the search.

(d) A comparator will be inhibited from registering a mis-match during those times when those bit positions which are not significant to the search are being interrogated.

(e) Wherein overlapping fields are to be "anded" together as a search logic requirement (combination (8) supra, for example), then the memory bit positions will be twice interrogated. On the first interrogation non-overlapping fields will be compared, as for instance all of the Arabic alphabetically identified fields. On the second interrogation the remaining non-overlapping fields (the Greek alphabetic fields, for example) will be compared. The comparators are not reset until the repeated interrogation is complete.

(f) Overlapping fields connected by an "or" expression can be compared during a single sequence of bit interrogation signals through use of a plurality of comparators during the same interrogation cycle.

The application of the above rules can probably be better understood by tracing the functional operation of the apparatus through several typical search operations. Therefore, the search combinations herein above identified as (7) and (8) will be chosen as illustrative of the principles involved.

*Search for (W1–A AND W2–A AND W2–B) OR (W1–α AND W2–α AND W2–β) OR (W1–A AND W2–β AND W3–C)*

As this search offers three alternative match possibilities (three parenthetical expressions connected by "or"), all three comparators, 50, 60, and 70 are to be employed. Also, since overlapping fields are "anded" together, multiple interrogations are required. For purposes of illustration, it will be assumed that at least an eight bit memory is available, and that words 1, 2, and 3 are actually the first three words in memory. The fields are chosen among the eight bit positions as follows:

Field A=bits 1–3 inclusive  Field α=2–5 inclusive
Field B=bits 4–6 inclusive  Field β=6–8 inclusive
Field C=bits 7–8 inclusive With the foregoing assumptions, the operation of the apparatus can be represented in tabular form as follows:

| Bit | Field | Field | 50 | WSS-1 | 60 | WSS-2 | 70 | WSS-3 |
|---|---|---|---|---|---|---|---|---|
| 1 | A | ---------- | Act. | Word 1 | Inh. | Word 1 | Act. | Word 1 |
| 2 | A | α | Act. | Word 1 | Act. | Word 1 | Act. | Word 1 |
| 3 | A | α | Act. | Word 1 | Act. | Word 1 | Act. | Word 1 |
| 4 | B | α | Act. | Word 2 | Act. | Word 1 | Act. | Word 1 |
| 5 | B | α | Act. | Word 2 | Act. | Word 1 | Inh. | Word 1 |
| 6 | B | β | Act. | Word 2 | Act. | Word 2 | Inh. | Word 1 |
| 7 | C | β | Inh. | Word 2 | Act. | Word 2 | Act. | Word 3 |
| 8 | C | β | Inh. | Word 2 | Act. | Word 2 | Act. | Word 3 |
| 1′ | A | ---------- | Act. | Word 2 | Inh. | Word 2 | Inh. | Word 2 |
| 2′ | A | α | Act. | Word 2 | Act. | Word 2 | Inh. | Word 2 |
| 3′ | A | α | Act. | Word 2 | Act. | Word 2 | Inh. | Word 2 |
| 4′ | B | α | Inh. | Word 2 | Act. | Word 2 | Inh. | Word 2 |
| 5′ | B | α | Inh. | Word 2 | Act. | Word 2 | Inh. | Word 2 |
| 6′ | B | β | Inh. | Word 2 | Inh. | Word 2 | Act. | Word 2 |
| 7′ | C | β | Inh. | Word 2 | Inh. | Word 2 | Act. | Word 2 |
| 8′ | C | β | Inh. | Word 2 | Inh. | Word 2 | Act. | Word 2 |

A study of the above table will reveal that the comparator 50 is performing the logic in the first pair of parentheses; comparator 60, the logic in the second pair; and the comparator 70, the logic in the third pair. During interrogation of the first bit position, the comparators 50 and 70 will both be active to compare on the first position of field A of word 1. The comparator 60 is inhibited during the first bit time, as it is to compare field α of word 1, and field α does not include the first bit position. During the second and third bit times all of the comparators are active, comparator 50 comparing on word 1, field A; comparator 60, comparing on word 1, field α; and comparator 70 comparing on word 1, field A. During the fourth and fifth bit times, comparator 50 and 60 are active and 70 inhibited. Comparator 50 compares on the first two positions of field B of word 2. At the same time, comparator 60 is comparing on the last two positions of field α of word 1. Comparator 70 is inhibited because the logic required of it during this cycle does not include these bit positions. During the sixth bit time, the comparator 50 completes the comparison of field B of word 2, while the comparator 60 is active to compare the first position of field β of word 2. The comparator 70 is inhibited during the sixth bit time, as it is only comparing on fields A and C during the first interrogation cycle. During the seventh and eighth bit times, the comparator 50 is inhibited, as the logic required of it does not include either field C or field β. The comparators 60 and 70 are active; comparator 60 comparing on the last two bit positions of field β of word 2, and comparator 70 comparing on field C of word 3.

Upon completion of the first interrogation of all bit positions of memory with the comparators connected as shown in the above table, each of the comparators will now store the matches and mis-matches of each memory word to a portion of the required search logic, as follows:

(a) Comparator 50 stores the matches (and mismatches) to field A of word 1 and field B of word 2.

(b) Comparator 60 stores the matches (and mismatches) to field α of word 1 and field β of word 2.

(c) Comparator 70 stores the matches (and mismatches) of field A of word 1 and field C of word 3.

It is to be noted that comparator 50 has not yet compared on field A of word 2. Comparator 60 has not yet compared on field α of word 2, and comparator 70 has not yet compared on field β of word 2. These are to be compared during the second (or primed) series of bit interrogations. At the first bit time on the second interrogation comparator 50 is active to compare on the first position of field A of word 2; and comparators 60 and 70 are inhibited. For the second and third bit times comparator 50 completes the comparison of field A of word 2, and the comparator 60 advances the comparison of field α of word 2 by two bit positions. The comparator 70 is inhibited, as it is to compare only on field β of word 2. For the fourth and fifth bit positions, comparators 50 and 70 are inhibited, and comparator 60 completes the comparison with field α of word 2. During the sixth through eighth bit times comparators 50 and 60 are inhibited, and comparator 70 compares on field β of word 2.

By the end of the second interrogation, each comparator will manifest the match or mis-match of each memory word to the search logic contained in the corresponding parenthetical expression. The "or'ed" outputs will cause the sequential readout of all words found to match one or more of the sought data content.

Obviously, certain constraints must be placed upon the distribution of fields among the words, lest certain logical expressions become redundant. For example, if the fields α and β had included all eight bit positions, then the second parenthetical expression (W1–α AND W2–α AND W2–β) would require a match to whole of word 2, and that the data content in field α of word 1 equal the data field content in α of word 2. If this condition of match were satisfied then obviously the less stringent expression (W1–A AND W2–A AND W2–B) would be satisfied. Therefore, the first expression would not truly be an alternative match condition. Conversely, a match on the less stringent requirement (W1–A AND W2–A AND W2–B) would override a mis-match to the more stringent condition.

*Search for W1–A AND W2–α AND W1–B AND W2–β AND W3–C*

In this search, there are no alternative matches. Consequently, all the required comparisons will be performed in a single comparator. Because the comparators are initially reset to a match manifestation, the unneeded comparators must be connected to operate in parallel with the required comparator. Fully inhibiting the unneeded comparators will not prevent false match indications, as this merely prevents comparison and would leave the inhibited comparators in the fully reset or match condition.

Because of the number of fields involved in this search, the memory will be assumed to have at least ten bit positions which will be allocated among the respective fields as follows:

Field A=bits 1–3 inclusive
Field B=bits 5–7 inclusive
Field C=bits 8–10 inclusive
Field α=2–5 inclusive
Field β=7–9 inclusive Again, because overlapping fields are involved in the search, two complete series of bit pulses will be applied to the bit interrogation lines 20. During the first series the Arabic alphabetic fields will be compared, and on the second, the Greek alphabetic fields will be compared. Again, the tabular form is employed to represent the operation of the apparatus at the various times:

| Bit | Field | Field | 50 | WSS-1 | 60 | WSS-2 | 70 | WSS-3 |
|---|---|---|---|---|---|---|---|---|
| 1 | A | ------ | Act. | Word 1 | Act. | Word 1 | Act. | Word 1 |
| 2 | A | α | Act. | Word 1 | Act. | Word 1 | Act. | Word 1 |
| 3 | A | α | Act. | Word 1 | Act. | Word 1 | Act. | Word 1 |
| 4 | ------ | α | Inh. | Word 1 | Inh. | Word 1 | Inh. | Word 1 |
| 5 | B | α | Act. | Word 1 | Act. | Word 1 | Act. | Word 1 |
| 6 | B | ------ | Act. | Word 1 | Act. | Word 1 | Act. | Word 1 |
| 7 | B | β | Act. | Word 1 | Act. | Word 1 | Act. | Word 1 |
| 8 | C | β | Act. | Word 3 | Act. | Word 3 | Act. | Word 3 |
| 9 | C | β | Act. | Word 3 | Act. | Word 3 | Act. | Word 3 |
| 10 | C | ------ | ---- | Word 3 | Act. | Word 3 | Act. | Word 3 |
| 1′ | A | ------ | Inh. | Word 2 | Inh. | Word 2 | Inh. | Word 2 |
| 2′ | A | α | Act. | Word 2 | Act. | Word 2 | Act. | Word 2 |
| 3′ | A | α | Act. | Word 2 | Act. | Word 2 | Act. | Word 2 |
| 4′ | ------ | α | Act. | Word 2 | Act. | Word 2 | Act. | Word 2 |
| 5′ | B | α | Act. | Word 2 | Act. | Word 2 | Act. | Word 2 |
| 6′ | B | ------ | Inh. | Word 2 | Inh. | Word 2 | Inh. | Word 2 |
| 7′ | B | β | Act. | Word 2 | Act. | Word 2 | Act. | Word 2 |
| 8′ | C | β | Act. | Word 2 | Act. | Word 2 | Act. | Word 2 |
| 9′ | C | β | Act. | Word 2 | Act. | Word 2 | Act. | Word 2 |
| 10′ | C | ------ | Inh. | Word 2 | Inh. | Word 2 | Inh. | Word 2 |

By virtue of the overlapping fields, and the logical "and" requirements for a match, it is evident that the data content of words 1, 2, and 3 in specified bit positions thereof must necessarily be equal as a prerequisite to a match, as follows:

Bit positions 2, 3, 5, and 7________ Word 1= Word 2
Bit positions 8 and 9 ______________ Word 2=Word 3

*The memory 10*

Although a core matrix memory has been disclosed as the preferred embodiment of the invention, it should be realized that a great variety of bi-stable storage elements can equally well be employed in a memory utilizing the principles of the instant invention. In this, as in other fully associative memories, it is necessary that the storage elements be capable of non-destructive interrogation; that is to say, that the stability status of the element is capable of producing a manifestation of its storage status without changing or destroying that status. This capability is necessitated by the mode of operation of an associative memory. For example, when a status interrogation pulse is applied to any bit line of a fully associative memory, that pulse will encounter storage elements, the status of which has been predetermined during the memory write cycle. The individual responses to this interrogation will vary in accordance with the respective statuses of the elements. Without non-destructive interrogation, each individual storage element would necessarily have to be restored to its respective storage state under control of apparatus which measured the individual response of each element to the interrogation. Not only would this type of destructive interrogation entail a considerable increase in total interrogation time because of the required regeneration time, but it also would require rather complex equipment. With non-destructive interrogation, on the other hand, the stability state of the individual element is not destroyed by the interrogation, and no account need be taken of either the nature of the interrogating pulse nor of the respective states of the elements, each element, of course, providing a unique response indicative of its state. For cores, the technique as taught by Newhouse in the Proceedings of the IRE, November 1957, page 1484, is preferably employed. In this technique, a toroidal core constructed of a material having a substantially square hysteresis loop produces a small response to an interrogating pulse having a sense tending to switch the core to its existent remanent state, and a large response to an interrogating pulse tending to switch the core to that state opposite to its remanent state, the interrogating pulse being of such amplitude and duration that its energy content is insufficient to overcome the elasticity of the core. For example, if a core in the positive remanent state is interogated with a positive pulse, that core will respond with a positive pulse of small amplitude. A core in the negative remanent state and interrogated with a positive pulse will respond with a positive pulse of large amplitude. Conversely, a core in the positive remanent state interrogated with a negative pulse will respond with a negative pulse of large amplitude, and a core in the negative remanent state and interrogated with a negative pulse will respond with a negative pulse of small amplitude. It is this magnitude of impulse that is advantageously utilized in the present invention. Any one word of the memory words is selected as the criterion upon which all other words in memory shall be examined. A standard interrogation signal is sequentially applied to the bit storage elements of the selected word and to all of the other corresponding bit storage elements of the remaining words in parallel. The individual responses of the bit storage elements of the remaining words are compared with the response of the bit storage element of the given word. If the responses match, the words match. Any one mis-match destroys the match. As a consequence, the logic requires the absence of mis-matches in order to register a match. To this end, mis-match detectors are provided, rather than match detectors.

As will be apparent from an examination of FIG. 3A, the core memory 10 is provided with a single bit line for each bit position in memory. Each of the bit lines (20–2, for example) threads the corresponding bit core of each of a plurality of words. Each core is further threaded with a word line (as for example, 30–2). Each word line threads all of the bit cores storing the respective bits of the corresponding word. These windings are the only ones required for the interrogation and read-out of the memory content in accordance with the teachings of the preferred embodiment of this invention. However, other windings in accordance with conventional core matrix practices may be incorporated in the matrix to provide for the conventional operation thereof and also to load the memory. These windings have been intentionally omitted from the drawings so as not to obscure the lucidity of the presentation, it being assumed that they are present, and that they have been employed to preestablish the cores in their respective remanent states so as to manifest the stored data words.

If, for example, it is assumed that the cores 31 through 38 are pre-established in their respective states to manifest the binary digits 1–0–1–1–0–0–0–1, as the first digit of each of eight words, and the first word is chosen as the search criterion; then, when a positive interrogation pulse is applied to the bit line 20–1, core 31 will yield a small positive response on line 30–1, core 32 a large positive response on line 30–2, core 33 a small positive response on line 30–3, core 34 a small positive response on line 30–4, core 35 a large positive response on line 30–5, core 36 a large positive response on line 30–6, core 37 a large positive response on line 30–7, and core 38 a small positive response on line 30–8. Since word 1 was arbitrarily chosen as the search criterion, the response of core 31 to the interrogation pulse, a small positive pulse, will be compared with the responses of all other cores. Since cores 32, 35, 36 and 37 all yielded a large positive impulse on their respective word lines 30–2, 30–5, 30–6, and 30–7, these cores will cause a mis-match registration of these words to the chosen word 1. The cores 31, 33, 34, and 38 will cause no mis-match registration and, thus, by the lack of a mis-match, register a match.

Interrogation of each bit order proceeds sequentially for each bit position wherein the data content is significant, as controlled by mask 40.

When the words, whose data content matches the sought criteria are found, the word lines are pulsed and the bit lines yield a response manifestive of the data content of the whole of the word. For example, if after interrogation of the significant fields it was found that words 3 and 5 matched the data in the selected fields of word 1, which was chosen as the search word, then the word line 30–1 would be pulsed (word 1 would register a match with itself), followed by pulses on word line 30–3, and 30–5. If each of these pulses on the word lines is a positive pulse of an amplitude and duration to produce non-destructive interrogation, then each core will produce an output on its associated bit line of either a large or small positive polarity. When word line 30–1 is pulsed, core 31, for example, will produce a small positive pulse on bit line 30–1. So, too, will all other cores linked by the word line produce an output pulse depending on the remanent state of the cores. Pulsing of word line 30–3 will yield a small positive pulse on word line 20–1. Since the word lines are sequentially pulsed each matching word will be read out sequentially parallel-by-bit. Although interrogation of memory will be for less than the whole data content of the word, readout will yield the total data content including the data in the field employed as a search criterion.

*The mask 40 and inhibit control 140*

The mask 40 has been shown in FIG. 1 as having eight input lines 41–48, and three output lines 141, 142, and 143. Actually, there will be one input line for each bit position in memory, and an actual memory constructed in accordance with the teachings of this invention would include considerably more than the eight bit orders illustrated in FIG. 1 or the four illustrated (with a drawing between the bit orders) in FIG. 3A. The number of output lines from mask 40 would in all probability not increase materially, as three comparators provide three alternative match conditions. Should more comparators be required then the mask 40 would have a corresponding increase in the number of output lines, one for each comparator.

It is the function of the mask 40 to controllably render each of the comparators 50, 60, or 70 active to compare, or inactive to compare (inhibit). Therefore, in the mask there is a switch for each one of the comparators for every bit position. Thus, with an eight bit memory there would be twenty-four switches. In FIG. 3A, with four bit positions illustrated, twelve switches are provided. These switches are shown as manually operable switches only to illustrate their function. In an actual searching system, they would electronic gates controllable by the search program, and would operate at speeds compatible with the other computer components.

The switches 41–5, 42–5, 43–5, and 48–5 control the comparator 50. Switches 41–6, 42–6, 43–6, and 48–6 control the comparator 60. Switches 41–7, 42–7, 43–7, and 48–7 control the comparator 70. Closure of any given switch effects a required change in the status of the associated comparator for the bit position of the bit position of the closed switch. If all of the comparators are initially conditioned to compare, then a pulse on line 41, if no switch in the series 41–5, 41–6, 41–7 is closed will not set the comparators to inhibit for interrogation of that bit order. If the interrogation of the second bit order requires comparator 50 to be active, and comparators 60 and 70 inhibited, then the switches 42–6 and 42–7 will be closed to change the status of the corresponding comparators 60 and 70. A switch is only closed when the status of the corresponding comparator is to be changed from its previous or its initial condition for the respective bit order.

Since each bit order receives a separately timed interrogation pulse, it is necessary that the comparators have sufficient time in advance of the interrogation of each bit position in memory 10 to have their status changed should such action be dictated by the closure of switches in mask 40. Closure of the switches themselves are effected in advance of the interrogation cycle and therefore, require no inter-bit time for their closure.

As will be explained in the description of the delay and drive circuits, a delay is injected in the bit drive circuits to memory to afford the necessary setup time for the comparators. As each line 41–48 receives a sequential signal, the preset closure of the switches in the mask 40 will cause these signals to appear selectively on the lines 141, 142, or 143 at the requisite bit times during the interrogation cycle.

The signals on the lines 141, 142, and 143 are respectively connected to the complementing connections of the flip-flops 144, 145, and 146. These flip-flops are bistable trigger devices of the complementing type, wherein a single wired connection thereto, when pulsed, will change the stability state of the trigger from its existent to its opposite state of stability. Each of the flip-flops is thus individually controllable to change its status under control of a respective one switch in each bit order of mask 40. The flip-flops 144, 145, and 146 are provided with a common reset line 147 which is connected to the "0" side of all the flip-flops and when impulsed will reset the flip-flops to a common stability state. This line, 147, is initially pulsed to reset all of the flip-flops 144, 145, and 146 prior to memory interrogation. A second common line 148 connected to the "1" side of the flip-flops 144, 145, and 146 sets the flip-flops to the "1" stability state when it is impulsed. This set line 148 serves to inhibit all comparators for a purpose hereinafter to be set forth.

Each of the flip-flops 144, 145, and 146 has a stability status output line respectively identified as 59, 69, and 79. These lines are connected to the "0" side of each of the respective flip-flops and produce a control potential so long as the flip-flop is in the "0" or reset stability status. These control potentials, appearing selectively on the lines 59, 69, and 79 at the requisite bit times, cause the comparators 50, 60, and 70 (respectively) to be active to compare data entered therein.

With the flip-flops 144, 145, and 146 all initially reset to the "0" state, control potentials will appear on all lines 59, 69, and 79 to render the comparators 50, 60, and 70 active to compare. Therefore, if any one comparator is to be inhibited for the first bit position, the appropriate switch 41–5, 41–6, or 41–7 must be closed in the first bit position order so as to change the status of the flip-flop to remove the compare-enabling control potential from the appropriate line 59, 69, or 79. Thereafter, whichever flip-flop was so switched must be switched back to its "0" state by a control pulse on the appropriate line 141, 142, or 143, before comparing can proceed in the respective comparator.

*Delay and drive circuits 110*

It has been stated that the individual bit lines 20–1 to 20–8 of memory are sequentially driven with a pulse, the energy content of which is insufficient to switch the cores, but is sufficient to provide a signal manifestive of the stability states of the cores, and that time must be allowed to permit the comparators to be conditioned. Therefore, the delay and drive circuits 110 are provided, both to delay the control pulses appearing sequentially on lines 41 to 48 and to provide the requisite positive pulse having an amplitude and wave-form to achieve the non-destructive interrogation of the cores in memory 10. Each of the lines 41 to 48 is, therefore, connected to a respective delay circuit 111–1 to 111–8 each of which produces a single output pulse for each applied input pulse, relayed by a fixed time interval. During this delay time, the control pulses on the lines 41–48 will, if a switch is closed, have sufficient time to change the status of the appropriate flip-flop. The outputs from the delay circuits 111–1 to 111–8 are respectively fed to drivers 112–1 to 112–8 which produce an output pulse of the requisite waveform to each of the respective bit interrogation lines 20–1 to 20–8 for the sequential interrogation of each memory bit position.

*The comparing units 50, 60, 70*

Each of the comparing units 50, 60, and 70 is identical, so that only the unit 50 need be described. As has been shown schematically in FIG. 1, each of the comparing units includes a word selection switch WSS which controllably connects each comparing unit to any one of the word lines 30. The remaining inputs to the comparing units include all of the word lines. It is thus that the data content of any one selected word is compared with the data content of all the words in memory. The results of the match (lack of a mis-match) as to each of the memory words are manifested on word comparison output lines 150, 160, and 170, there being one line for each memory word.

As is shown in FIG. 3B, the word selection switch may also consist of a plurality of individual single-pole-single-throw switches having one pole thereof individually connected to each respective one of the word lines 20, and the remaining poles commoned. Because the word selection switches must be changed as the interrogation of memory 10 proceeds from bit to bit, the manual switches illustrated in FIG. 3B, for graphic functional purposes, would actually be electronic switches capable of controlled closure during the inter-bit delay introduced by each of the delay lines 111 (FIG. 3A).

The common connection from the word selection switch WSS–1 is connected to a pulse amplifier and shaper 51, the output from which, via line 52, is applied as an input to each of the mis-match detectors 53–1, 53–2, 53–3, etc., there being a mis-match detector for each word line in memory. Each mis-match detector 53–1 to 53–8 has an individual second input from a corresponding one of the word lines 30–1 to 30–8. Each mis-match detector 53, therefore, always compares the response of the same word line with the response of a word line selected by closure of one of the switches in the group WSS–1. Each mis-match detector produces a signal manifestive of a match (if such has occurred) on its respective output line 54–1 to 54–8 to corresponding diodes 55–1 to 55–8, the outputs from these being the lines identified generally as 150 in FIG. 1 and individually as 150–1, 150–2, 150–3, etc., in FIG. 3B.

Each of the mis-match detectors has a connection 56–1, 56–2, 56–3, etc., connected to a common line 57 which, when impulsed at an appropriate time, will reset all of the mis-match detectors to a match registration condition. A second connection 58–1, 58–2, 58–3, etc., commoned by the line 59 provides the necessary control to render the mis-match detectors 53–1 to 53–8 active or inactive to register a mis-match if it should occur.

Referring now to FIG. 4, a typical mis-match detector with its input circuits, output circuit, reset circuit, and inhibit circuit is shown in somewhat more detail. Remembering that each mis-match detector 53 is to compare the bit manifestation of each selected word with the respective bit response of one permanently connected memory word and produce an output manifestation only if there has been a complete lack of mis-matches, it should be apparent that some form of mis-match storage is required. If in FIG. 4, the successive bit responses of the selected word (as determined by the setting of the word selection switch WSS–1) appear on line 52, and the bit responses of word 1 appear on line 30–1, then each successive interrogated bit position will provide a comparison of the response of word 1 and the selected word in the exclusive "or" circuit 153–1. Since a standard positive interrogation signal is employed, a core can respond with either a large positive pulse or a small positive pulse. Therefore, a large or small positive pulse will appear on line 52, and a large or small positive pulse will appear on line 30–1. Of the four combinations of pulses which can appear on the lines 52 and 30–1, two will manifest a match and two a mis-match. Inasmuch as an exclusive "or" circuit will produce an output if one or the other of the inputs thereto, but not both, is present, the circuit 153–1 will produce an output if line 52 has a large pulse and line 30–1 a small pulse, or vice-versa. Since this is a mis-match condition, the exclusive "or" 153–1 will produce an output on line 154–1 upon every mis-match between the cores storing corresponding bits of word 1 and the selected word. The mis-match impulse appearing on line 154–1 will be passed by the "and" gate 155–1 only if the gate is activated by a control potential on line 58–1. When it is desired to inhibit the comparison, the control potential applied to line 59 in common to all mis-match detectors is removed so as to block the operation of "and" gate 155–1 to prevent its passing on any impulse appearing on line 154–1.

If a mis-match impulse is passed by the "and" gate 155–1 and appears on line 156–1, a flip-flop 157–1 will be switched from its "1" reset condition to the "0" set state. This flip-flop 157–1 will retain its prior stability status until it is either set by a pulse on line 156–1, or reset by a pulse on line 56–1. The output tap 54–1 is taken from the "1" or reset side of the flip-flop, so that a useable output will be produced only when the flip-flop 157–1 remains in its reset status. Since all flip-flops are initially reset, it is important that each comparator 50, 60, and 70 be utilized to compare some significant data, even if several comparators must be paralleled in operation. Were a comparator not so used, the initial reset condition of it could register a false word match. An alternative mode of operation would be to force a mis-match in unused comparators by applying a set pulse to the "0" side of the flip-flops 157.

Since, upon the complete interrogation of memory 10 for the required match conditions, each of the mis-match detectors 53–1 to 53–8, 63–1 to 63–8 (not shown, but connected as are the detectors 53–1 to 53–8), and 73–1 to 73–8 (also not shown) will individually store the match and no-match conditions for each word line and each required comparison, and produce an output manifestation of a match on one or more of the lines 150–1 to 150–8, 160–1 to 160–8, and 170–1 to 170–8. Then, since correspondingly numbered word match lines from each of the comparators 50, 60, and 70 are commoned by the respective lines 180–1 to 180–8 through diodes a match indication on any word match line from any one comparator will potentialize a similarly numbered line 180. For example, if line 150–3 were potentialized, signalling a match of word 3 to the logic compared in comparator 50, and the lines 160–3 and 170–3 were not so potentialized, the line 180–3 would be potentialized to signal a match of word 3 to at least one of the alternative search requirements. This operation is consistent with the "or" logic ascribed to it in prior descriptions.

*Readout control*

If it is assumed that the lines 180–1 to 180–8 (FIG. 3C) are selective potentialized in accordance with the presence of the matches as above described, then each one of the respective "and" gates 81–1 to 81–8 will be partially conditioned for operation in accordance with the respective potentialization of the lines 180–1 to 180–8. Timing pulses sequentially applied to the hubs 82 supply the necessary other input to the "and" gates 81 so as to produce on the output lines 83–1 to 83–8 drive pulses on those lines corresponding to the selectively potentialized lines 180–1 to 180–8. These drive pulses are shaped in the shapers 84–1 to 84–8 so as to achieve the waveform necessary to achieve non-destructive readout of the data content of the matching words. During such readout, the comparators are inhibited to prevent the readout drive pulses from affecting the status of any of the flip-flops which store the matches and mis-matches. This inhibit action is achieved from the first timing pulse hub 82–0 by a connection to line 148 (FIG. 3C) which sets the flip-flops 144, 145, 146 to the "1" state to inhibit the comparators 50, 60, and 70 from changing the state of their mis-match detectors, as previously described.

Although it has not been shown, as not being germaine to the invention, a readout control would be provided such that only the requisite number of timing pulses, as determined by the number of matches, would be supplied. For example, if a memory contained one hundred words and only two matched, it would be wasteful of time to provide one hundred readout pulses, of which only two were used. Therefore, circuits would be provided to supply only two readout pulses sequentially to the matching word lines and then signal an "end of readout" so as to permit the program controls to initiate the next program step. A circuit for performing such an operation is described in co-pending application of H. E. Petersen et al., Serial Number 617,238, filed October 7, 1960, now abandoned.

*Programming and control of timing*

From the detailed description of the operation of the invention in performing various searches, it is obvious that the various switches and timing pulses would not be manually controlled. In modern electronic computer technology, programming and timing devices are so well-known and highly developed that it is believed unnecessary to describe such controls in detail. Suffice it to say, that for every switch and timing pulse position, there would be an appropriate control exercised by the program unit, so as to effect the necessary sequential operations as described. For example, the timing ring 120 (FIGS. 1 and 3C) and the timing pulse hubs 82 (FIGS. 1 and 3C) could utilize a timing ring such as that disclosed in the Palmer et al., U.S. Patent 2,658,681, issued November 10, 1953.

A typical set of simplified program instructions for a search would be as follows:

(1) Set the switches in mask 40 to define the search fields.

(2) Reset mis-match flip-flops 157–1 to 157–8, 167–1 to 167–8, and 177–1 to 177–8.

(3) Start timing ring 120. (a) Timing ring 120 will reset flip-flops 144, 145, 146.

(4) Coordinate the stepping of timing ring 120 with the program unit so as to control the word selection switches WSS–1, WSS–2, and WSS–3 for each bit position in accordance with the search requirements.

(5) Reset the switches in mask 40 to effect a second search (if such is required).

(6) Inhibit reset of mis-match flip-flops.

(7) Repeat step 3 as described above.

(8) Repeat step 4 as described above.

(9) Energize a second ring (not shown) to apply readout pulses to hubs 82 (FIG. 3C). (a) The first timing pulse here will inhibit the comparator 50, 60, and 70 as explained.

(10) End of search.

*Summary of operation*

The mask 40 selects the fields of data which shall form the search criteria. The comparators 50, 60, and 70 and their word selection switches WSS–1, WSS–2, and WSS–3 select the words in memory requires to be matched for data content in the respective fields. The serial interrogation of the bit lines 20 produces responses on the word lines 30 as a function of the respective remanent storage states of the bi-stable storage elements in memory 10, which responses are compared in the comparators 50, 60, and 70 in accordance with the switch settings thereof, and the mis-matches stored or not stored under control of the inhibit control exercised by mask 40. Matches manifested on the lines 180 control the drive circuits 80 to apply selective readout pulses regeneratively on the word lines 30, to produce bit readout pulses on the lines 90 in accordance with the remanent states of the bi-stable elements storing the bits of the "found" word in memory 10.

The comparators 50, 60, and 70 are initially reset to manifest matches, and will register and store any mis-match of the compared data. For multiple field comparison, the comparators will "and" all data compared therein. Where data enters a comparator and should not be compared therein (the search logic does not require a match thereof), the comparator is inhibited from registering a mis-match. The outputs from the comparators are "ored" together for each respective word so that a match in any one or more comparators will produce a readout of the word.

Interrogation proceeds serially-by-bit for each different field of each different word to be "anded." For interrogation of the same field of two different words, a serial-by-bit, parallel-by-field interrogation in two different comparators can be effected.

Readout of words matching the search criterial is parallel-by-bit, serially-by-matching words.

Thus, with the illustrated capacity of the preferred embodiment, it is possible to construct a great variety of search criteria by "anding" and "oring" the fields of data. With the three comparators shown, the embodiments is limited to three "or" functions, but the "and" functions are not so limited. Any number of fields among any number of words can be "anded," as this merely requires the repeated operation of each comparator without reset.

Although an 8 x 8 memory has been illustrated, it is obvious from the break lines in the drawings (particularly FIG. 3A) that a memory system for use with an electronic data processing system would encompass a far greater bit and word capacity.

While the invention has been particularly shown and described with reference to a preferred embodiment thereof, it will be understood by those skilled in the art that various changes in form and details may be made therein without departing from the spirit and scope of the invention.

What is claimed is:

1. A system for searching the data content of a memory having a plurality of bi-stable storage elements, each of which is selectively pre-established in one of two stable states to manifest the respective binary bits of a plurality of stored data words comprising, (1) means for selecting predetermined bit positions of any given memory word for comparison with corresponding bit positions of the remaining words;

(2) means for comparing the respective stability states of those elements manifesting the bits in the selected bit positions of the given word simultaneously with all of the stability states of those elements manifesting the bits in corresponding bit positions of the remaining words;

(3) registering means for registering those of the remaining words having bi-stable elements whose stability states match the states of the corresponding elements manifesting the bits in the selected bit positions of the given word; and (4) means under control of said registering means for controlling the readout of the total data content of those of the remaining words registering a match.

2. A system for searching the data content of a memory having a plurality of bi-stable storage elements each of which is selectively pre-established in one of two stable states to manifest the respective binary bits of a plurality of stored data words comprising, (1) means for selecting predetermined corresponding bit positions of a plurality of given memory words for comparison with corresponding bit positions of the remaining words, (2) means for comparing the respective stability states of those elements manifesting the bits in the selected bit positions of the given words simultaneously with all of the stability states of those elements manifesting the bits in corresponding bit positions of the remaining words, (3) means for registering those of the remaining words having bi-stable elements whose stability states match the states of the corresponding elements manifesting the bits in the selected bit positions of any one of said given words, (4) and means under control of said means for registering for controlling the readout of the total data content of those remaining words registering a match.

3. A system for searching the data content of a memory having a plurality of bi-stable storage elements each of which is selectively pre-established in one of two stable states to manifest the respective binary bits of a plurality of stored data words comprising, (1) means for selecting predetermined different bit positions from each of a plurality of given memory words for comparison with corresponding bit positions of the remaining words, (2) means for comparing the respective stability states of those elements manifesting the bits in the selected bit positions simultaneously with all of the stability states of these elements manifesting the bits in corresponding bit positions of the remaining words, (3) means for registering those of the remaining words having bi-stable elements whose stability states match the states of all of the corresponding elements manifesting the bits in all the selected bit positions of all said given words, (4) and means under control of said means for registering for controlling the readout of the total data content of those remaining words registering a match.

4. A system for searching the data content of a memory having a plurality of bi-stable storage elements each of which is selectively pre-established in one of two stable states to manifest the respective binary bits of a plurality of stored data words comprising, (1) means for selecting a first set of predetermined bit positions from any one given memory word for comparison with other words in memory, (2) means for selecting a second set of different predetermined bit positions from a given plurality of memory words, (3) means for comparing the respective stability states of those elements manifesting the bits in all the selected bit positions of said given word and said plurality of words with all of the stability states of those elements manifesting the bits in corresponding bit positions of the non-selected words, (4) and means for registering those non-selected words having bi-stable elements whose stability states match the states of the corresponding elements manifesting the bit statuses in the selected bit positions of said given word and the stability states of those elements manifesting the bit statuses in the selected bit positions of at least one word of said plurality of given words.

5. A system for searching the data content of a memory having a plurality of bi-stable magnetic core storage elements selectively pre-established in one of their remanent magnetic states to manifest the respective bit statuses of a plurality of stored data words, each memory core having a bit winding and a word winding, comprising;

(1) a bit line connecting each of said bit windings on each core storing the correspondingly ordered data bit in each word;

(2) a word line connecting each of said word windings on each core storing all the data bits of each of said words;

(3) means for applying an interrogation pulse to each of said bit lines in succession, each said pulse having such electrical properties that it is operative to produce in each core a magnetic response manifestive of the remanent state thereof without destruction of that remanent state, and producing on each of said word lines a succession of correspondingly timed core response signals manifestive of the respective remanent states of the cores operatively coupled thereby;

(4) comparing means, for comparing the succession of core response signals appearing on a selected one of said word lines with the succession of core response signals appearing on each of said word lines, and producing a mis-match signal individual to each memory word, upon the occurrence of a core response signal on each word line different from the correspondingly timed core response signal on said selected word line;

(5) means for selectively connecting any given word line to said comparing means during the time that any given ones of said bit lines are receiving an interrogation pulse;

(6) mis-match storage means controlled by said comparing means, and operative responsive to said mis-match signals produced thereby to store the occurrence of a mis-matching signal for each word;

(7) means selectively operable to render said mis-match storage means inoperable to store mis-matches during the times that selected ones of said bit lines are receiving the bit interrogation pulses; and (8) means responsive to said mis-match storage means for producing a signal individual to each respective word line manifestive of the lack of a mis-match storage.

6. A system for searching the data content of a memory having a plurality of bi-stable magnetic core storage elements selectively pre-established in one of their remanent magnetic states to manifest the respective bit statuses of a plurality of stored data words, each memory core having a bit winding and a word winding, comprising:

(1) a bit line connecting each of said bit windings on each core storing the correspondingly ordered data bit in each word;

(2) a word line connecting each of said word windings on each core storing all the data bits of each of said words;

(3) means for applying an interrogation pulse to each of said bit lines in succession, each said pulse having such electrical properties that it is operative to produce in each core a magnetic response manifestive of the remanent state thereof without destruction of that remanent state, and the succession of pulses producing on each of said word lines a succession of correspondingly timed core response signals manifestive of the respective remanent states of the cores operatively coupled thereby;

(4) a plurality of comparing means, each operative to compare the succession of core response signals appearing on a selected different one of said word lines with the succession of core response signals appearing on each of said word lines, and producing a mis-match signal individual to each memory word, upon the occurrence of a core response signal on each word line differing from the correspondingly timed core response signal on said selected word line;

(5) means for controllably connecting a different given word line to each of said comparing means during the time that any given ones of said bit lines are receiving an interrogating pulse;

(6) a plurality of mis-match storage means controlled by each of said comparing means, and operative responsive to said mis-match signals produced by each one thereof to store the occurrence of a mis-matching signal for each word compared in the respective comparing unit;

(7) means selectively operable to render each of said mis-match storage means inoperable to store mis-matches during the times that selected ones of said bit lines are receiving the bit interrogation pulses; and (8) means responsive to said mis-match storage means for producing a signal individual to each respective word line manifestive of the lack of a mis-match storage.

7. A system for searching the data content of a memory having a plurality of bi-stable magnetic core storage elements selectively pre-established in one of their remanent magnetic states to manifest the respective bit statuses of a plurality of stored data words, a separate bit line operatively coupling all the cores storing the corresponding bit of each of said memory words, and a separate word line operatively coupling all the cores storing the bits of each respective memory word, comprising.

(1) means for applying an interrogation pulse to each separate bit line in succession, each of said pulses having an energy content insufficient to change the pre-established remanent state of the cores but operative to produce in the cores a different magnetic response for each of the two remanent states thereof, to thus produce on each of said word lines a succession of signals manifestive of the remanent states of the cores coupled by each of said word lines and influenced by the succession of pulses applied to said bit lines;

(2) comparing means, having a selectable connection to any one of said word lines and a permanent connection to each of said word lines, and operative to compare the succession of signals on each of said word lines with the succession of signals on said selected one of said word lines and producing a mis-match signal for each word line upon the occurrence of a signal dis-similar to the simultaneously occurring signal on said selected word line, (3) a mis-match storage means associated with each of said word lines and operative responsive to the mis-match signal for each word to store the respective mis-matches, the said storage means producing output signals manifestive of the lack of a mis-match for each respective data word;

(4) means for inhibiting said mis-match storage means from storing a mis-match during the times that selected ones of said bit lines have interrogation pulses applied thereto;

(5) means for selectively controlling the connection of said comparing means to given ones of said word lines during the times that predetermined ones of said bit lines have an interrogation pulse applied thereto;

(6) and means responsive to the lack of mis-match signals produced by said storing means for sequentially applying a readout pulse to each of said word lines whose corresponding storage means fails to store a mis-match.

8. A system for searching the data content of a memory having a plurality of bi-stable magnetic core storage elements selectively pre-established in one of their remanent magnetic states to manifest the respective bit statuses of a plurality of stored data words, a separate bit line operatively coupling all the cores storing the corresponding bit of each of said memory words, and a separate word line operatively coupling all the cores storing the bits of each respective memory word, comprising (1) means for applying an interrogation pulse to each separate bit line in succession, each of said pulses having an energy content insufficient to change the pre-established remanent state of the cores but operative to produce in the cores a different magnetic response for each of the two remanent states thereof, to thus produce on each of said word lines a succession of signals manifestive of the remanent states of the cores coupled by each of said word lines and influenced by the succession of pulses applied to said bit lines;

(2) an exclusive OR gate operatively associated with each of said word lines, and having a first and a second input terminal and a single output terminal, said first input terminal being connected to a corresponding one word line, and second input terminal being connected to the second input terminals of the remaining exclusive OR gates;

(3) an AND gate operatively associated with each said exclusive OR gates, and having a first and a second input terminal and a single output terminal, the first input terminal being connected to the output terminal of the associated exclusive OR gate, and the second input terminal being connected to the second input terminals of the remaining AND gates;

(4) a bi-stable trigger device operatively associated with each said AND gate, and having a first and a second control terminal for selectively establishing the trigger in its respective stable states and a single output terminal operative to produce a signal manifestive of the second of said stability states, the said first control terminal being connected to the output terminal of the associated AND gate, and the second control terminal being connected to the second terminal of the other triggers to reset the triggers to a common first stability state, when said common connection is selectively potentialized;

(5) means for applying an enabling potential to the connected second terminals of said AND gates during the times that predetermined ones of said bit lines are receiving interrogation pulses;

(6) means for selectively connecting the commoned connections to said second terminal of said exclusive OR gates to predetermined ones of said word lines during the times that given ones of said bit lines are receiving interrogation pulses;

(7) and means controlled by output signals from each of said trigger devices for applying a readout pulse to each word line whose corresponding trigger resides in the second of said stable states in seriate progression.

9. A system for searching the data content of a memory having a plurality of bi-stable magnetic core storage elements selectively pre-established in one of their remanent magnetic states to manifest the respective bit statuses of a plurality of stored data words, a separate bit line operatively coupling all the cores storing the corresponding bit of each of said memory words, and a separate word line operatively coupling all the cores storing the bits of each respective memory word, comprising (1) means for applying an interrogation pulse to each separate bit line in succession, each of said pulses having an energy content insufficient to change the pre-established remanent state of the cores but operative to produce in the cores a different magnetic response for each of the two remanent states thereof, to thus produce on each of said word lines a succession of signals manifestive of the remanent states of the cores coupled by each of said word lines and influenced by the succession of pulses applied to said bit lines;

(2) a plurality of groups of exclusive OR gates operatively associated with each of said word lines, each having a first and a second input terminal and a single output terminal, said first input terminal of one gate from each group being connected to an associated word line, and said second terminal being connected to the said second terminal of each of the gates in the same group;

(3) a plurality of groups of AND gates operatively associated with corresponding ones of said exclusive OR gates in the corresponding groups, each having a first and a second input terminal and a single output terminal, the said first input terminal being connected to the output terminal of the associated exclusive OR gate in a corresponding group, and the said second input terminal being connected to the second input terminals of the remaining AND gates in the same group;

(4) a plurality of groups of bi-stable trigger devices operatively associated with corresponding ones of said AND gates in the corresponding groups, each having a first and a second control terminal for establishing the trigger in its respective stable states and a single output terminal operative to produce a signal manifestive of the second of said stability states, the first control terminal being connected to the output terminal of the associated AND gate in the corresponding group, and the second terminal being connected to the second terminal of all triggers in all groups to reset the triggers to a common first stability state when said common connection is potentialized;

(5) means for selectively applying an enabling potential to each of the commoned second terminals of each of said groups of AND gates during the times that predetermined ones of said bit lines are receiving interrogation pulses;

(6) means for selectively connecting the commoned connections to said second terminals in each of said groups of exclusive OR gates to predetermined ones of said words during the times that given ones of said bit lines are receiving interrogation pulses;

(7) means connecting the output terminal of each of said triggers in each of said groups with the output terminal of a corresponding trigger in the other groups;

(8) and means responsive to the output signal at any one of the commoned output terminals of said triggers for applying a readout pulse to the word line operatively associated therewith through the associated exclusive OR gate, and the associated AND gate.

References Cited by the Examiner

UNITED STATES PATENTS 3,031,650 4/1962 Koerner.

OTHER REFERENCES

Pages 106–121, April 1961, Kiseda et al., "A Magnetic Associative Memory," IBM Journal.

Pages 179–182, Seeber, "Associative Self-Sorting Memory," 1960 EJCC.

ROBERT C. BAILEY, *Primary Examiner.*

MALCOLM A. MORRISON, *Examiner.*